United States Patent
Binette et al.

(10) Patent No.: US 6,793,593 B2
(45) Date of Patent: Sep. 21, 2004

(54) GOLF BALL WITH DUAL COVER

(75) Inventors: Mark L. Binette, Ludlow, MA (US); David M. Melanson, Northampton, MA (US); Michael J. Tzivanis, Chicopee, MA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 10/375,434

(22) Filed: Feb. 27, 2003

(65) Prior Publication Data

US 2003/0190976 A1 Oct. 9, 2003

Related U.S. Application Data

(63) Continuation-in-part of application No. 08/877,937, filed on Jun. 18, 1997, now abandoned, which is a continuation-in-part of application No. 08/490,963, filed on Jun. 15, 1995, now Pat. No. 6,042,488.
(60) Provisional application No. 60/217,934, filed on Jul. 13, 2000.

(51) Int. Cl.[7] ............................................. A63B 37/06
(52) U.S. Cl. ...................................................... 473/374
(58) Field of Search ................................ 473/351, 368, 473/367, 374, 363

(56) References Cited

U.S. PATENT DOCUMENTS

| | | | |
|---|---|---|---|
| 4,272,079 A | 6/1981 | Nakade et al. | |
| 4,650,193 A | 3/1987 | Molitor et al. | |
| 4,683,257 A | 7/1987 | Kakiuchi et al. | |
| 4,714,253 A | 12/1987 | Nakahara et al. | |
| 4,848,770 A | 7/1989 | Shama | |
| 4,858,923 A | 8/1989 | Gobush et al. | |
| 4,919,434 A | 4/1990 | Saito | |
| 4,929,678 A | 5/1990 | Hamada et al. | |
| 4,979,746 A | 12/1990 | Gentiluomo | |
| 5,184,828 A | 2/1993 | Kim et al. | |
| 5,215,308 A | * 6/1993 | Hiraoka et al. | 473/372 |
| 5,253,871 A | 10/1993 | Viollaz | |
| 5,273,286 A | 12/1993 | Sun | |
| 5,312,857 A | 5/1994 | Sullivan | |
| 5,439,227 A | 8/1995 | Egashira et al. | |
| 5,556,098 A | 9/1996 | Higuchi et al. | |
| 5,567,772 A | 10/1996 | Hagman et al. | |
| 5,628,699 A | 5/1997 | Maruko et al. | |
| 5,725,442 A | 3/1998 | Higuchi et al. | |
| 5,779,561 A | 7/1998 | Sullivan et al. | |
| 5,830,087 A | 11/1998 | Sullivan et al. | |
| 6,042,488 A | * 3/2000 | Sullivan et al. | 473/374 |
| 6,277,035 B1 | 8/2001 | Sullivan et al. | |
| 6,409,614 B1 | * 6/2002 | Binette et al. | 473/371 |
| 6,575,848 B2 | * 6/2003 | Bissonnette et al. | 473/377 |

* cited by examiner

Primary Examiner—Mark S. Graham
Assistant Examiner—Raeann Gordon

(57) ABSTRACT

Disclosed herein is a multi-layer golf ball having a core, an inner cover layer comprising an ionomer and having Shore D hardness of about 65 or less, and an outer cover layer comprising an ionomer and having a Shore D hardness of at least 60. The outer cover layer is harder than the inner cover layer. The core preferably comprises a high molecular weight polybutadiene that exhibits an ultra high Mooney viscosity. The sum of the thickness of the inner cover layer and the thickness of the outer cover layer is greater than 0.090 inches. A method of making the golf ball also is disclosed.

26 Claims, 1 Drawing Sheet

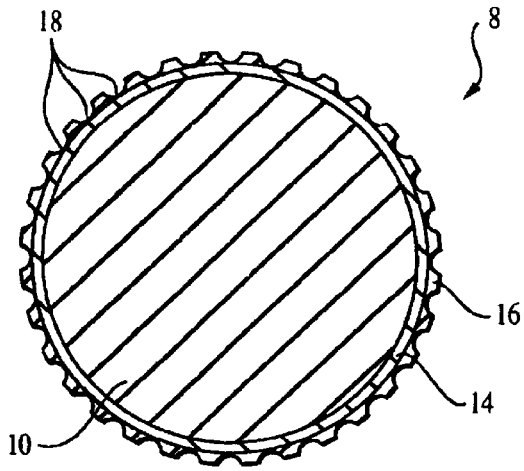

FIG. 1

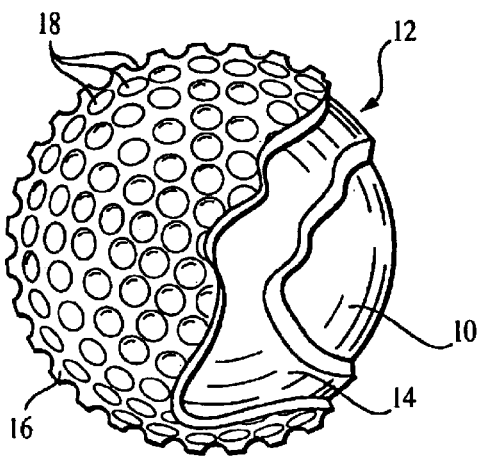

FIG. 2

FOR CERTAIN EMBODIMENTS:
INNER COVER HARDNESS ≤ 65 SHORE D

FOR CERTAIN EMBODIMENTS:
OUTER COVER HARDNESS > INNER COVER HARDNESS

FOR CERTAIN EMBODIMENTS:
OUTER COVER HARDNESS ≥ 60 SHORE D

FOR CERTAIN EMBODIMENTS:
TOTAL THICKNESS OF INNER COVER LAYER AND OUTER COVER LAYER ≥ 0.090 INCHES

FOR CERTAIN EMBODIMENTS:
GOLF BALL DIAMETER/
(TOTAL THICKNESS OF INNER COVER LAYER AND OUTER COVER LAYER) < 19

FOR CERTAIN EMBODIMENTS:
GOLF BALL PGA COMPRESSION ≤ 80

FOR CERTAIN EMBODIMENTS:
GOLF BALL COEFFICIENT OF RESTITUTION ≥ 0.780

GOLF BALL WITH DUAL COVER

RELATED APPLICATIONS

This is a continuation-in-part of U.S. application Ser. No. 08/877,937 filed Jun. 18, 1997, now abandoned which is a continuation-in-part of U.S. application Ser. No. 08/490,963 filed Jun. 15, 1995, now U.S. Pat. No. 6,042,488. This application also claims priority to Provisional Application No. 60/217,934, filed Jul. 13, 2000.

FIELD OF THE INVENTION

The present invention generally relates to golf balls, and, more particularly, to a golf ball having a solid core and a multi-layer ionomeric cover.

BACKGROUND OF THE INVENTION

Golf balls traditionally have been categorized in three different groups, namely, as one-piece, two-piece and three-piece balls. Conventional two-piece golf balls include a solid resilient core having a cover of a different type of material molded thereon. Three-piece golf balls traditionally have included a liquid or solid center, elastomeric winding around the center, and a molded cover. Solid cores of both two and three-piece balls often are made of polybutadiene and the molded covers generally are made of natural balata, synthetic balata, or ionomeric resins.

Ionomeric resins are polymers containing interchain ionic bonding. As a result of their toughness, durability and flight characteristics, various ionomeric resins sold by E. I. DuPont de Nemours & Company under the trademark "Surlyne®" and by the Exxon Corporation (see U.S. Pat. No. 4,911,451) under the trademark "Escor®" and the trade name "Iotek," have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid or maleic acid. Metal ions, such as sodium or zinc, are used to neutralize some portion of the acidic group in the copolymer, resulting in a thermoplastic elastomer exhibiting enhanced properties, i.e., durability, etc., for golf ball cover construction over balata.

While there are currently more than fifty (50) commercial grades of ionomers available from Exxon and DuPont, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting the desired combination of playability properties.

Golf balls are typically described in terms of their size, weight, composition, dimple pattern, compression, hardness, durability, spin rate, and coefficient of restitution (COR). One way to measure the COR of a golf ball is to propel the ball at a given speed against a hard massive surface, and to measure its incoming and outgoing velocity. The COR is the ratio of the outgoing velocity to the incoming velocity and is expressed as a decimal between zero and one.

There is no United States Golf Association (USGA) limit on the COR of a golf ball but the initial velocity of the golf ball must not exceed 250±5 ft/second. As a result, the industry goal for initial velocity is 255 ft/second, and the industry strives to maximize the COR without violating this limit. With these considerations in mind, the following objectives of the present invention golf ball are noted.

An object of the present invention is to provide a golf ball having a soft "feel" or compression while maintaining good durability and a high coefficient of restitution.

Another object of the invention is to provide a golf ball having a good coefficient of restitution as compared to other golf balls having a similar compression and surface hardness.

Yet another object of the invention is to provide a soft golf ball having a moderate spin rate and good carrying distance while maintaining a relatively soft compression.

Another object of the invention is to provide a method of making a golf ball having the properties described above.

SUMMARY OF THE INVENTION

The present invention provides, in a first aspect, a golf ball comprising a core, an inner cover layer, and an outer cover layer disposed over the inner cover layer wherein the sum of the thicknesses of the inner and outer cover layers is at least 0.090 inches.

The core comprises an improved polybutadiene composition having an ultra-high Mooney viscosity and/or is high molecular weight polybutadiene, and preferably, a polybutadiene formed from a neodymium catalyst.

The inner cover layer comprises a particular combination of components as follows. The inner cover layer comprises at least 50 percent by weight of an ionomer and has a thickness of 0.040–0.050 inches. The resulting inner cover layer exhibits a Shore D hardness of 56–65. The outer cover layer also comprises an ionomer and is harder than the inner cover layer and exhibits a Shore D hardness of 65–71. The outer cover layer has a thickness of about 0.050–0.060 inches.

The resulting golf ball exhibits a PGA compression of about 65–75, and a coefficient of restitution of about 0.786–0.806. The golf ball has a weight in the range of 45.0–46.0 grams. Preferably, the resulting golf ball utilizes a particular configuration of components such that the ratio of the diameter of the ball to the sum of the thickness of the inner and the outer cover layer is less than 19:1.

In yet another aspect, the present invention provides a method of making a multi-layer golf ball comprising obtaining a golf ball core, forming a thermoplastic inner cover layer over the core, and forming an outer cover layer over the inner cover layer. The inner cover layer which is formed exhibits a Shore D hardness of about 56–65 or less. The outer cover layer which is formed over the inner cover layer exhibits a Shore D hardness of about 65–70 and is harder than the inner cover layer. The combined thickness of the inner cover layer and the outer cover layer is at least 0.090 inches.

In still another aspect according to the present invention, a multi-layer golf ball is provided which comprises a core, a mantle or inner cover layer disposed on the core, and an outer cover layer disposed on the mantle layer. The mantle layer comprises at least 50% ionomer based on the weight of the mantle layer. The mantle layer exhibits a thickness in the range of from about 0.040 to about 0.050 inches. The outer cover layer exhibits a hardness which is greater than the hardness of the mantle layer. The sum of the thicknesses of the mantle layer and the outer cover layer is at least 0.090 inches.

BRIEF DESCRIPTION OF THE DRAWINGS

FIG. 1 shows a cross-sectional view of a golf ball according to a preferred embodiment of the invention.

FIG. 2 shows a diametrical cross-sectional view of the golf ball shown in FIG. 1.

DETAILED DESCRIPTION OF THE PREFERRED EMBODIMENTS

The preferred embodiment golf ball according to the present invention has a central core and a cover which includes at least two ionomeric layers. The inner cover layer is softer than the outer cover layer. This type of construction results in a golf ball having a soft compression while maintaining a good COR and a moderate spin rate.

The invention in a preferred form is a golf ball comprising a core, an inner cover layer comprising an ionomer and an outer cover layer comprising an ionomer. The inner cover layer has a Shore D hardness of about 56–65. The outer cover layer has a Shore D hardness which is greater than the Shore D hardness of the inner cover layer and is about 65–70. The sum of the thickness of the inner cover layer and the thickness of the outer cover layer is at least 0.090 inches (0.23 mm).

The golf ball core typically is selected from the group consisting of non-wound cores containing liquid, gel or solid and wound cores. Preferably, the core is solid.

The golf ball of the invention preferably has a COR of at least 0.780, and more preferably about 0.786–0.806 The golf ball has a weight in the range of 45.0–46.0 g. Preferably, the ratio of the diameter of the ball to the sum of the thickness of the inner cover layer and outer cover layer is less than 19:1 and more preferably less than about 17:1. The PGA compression of the golf ball according to a preferred embodiment of the invention is preferably about 65–75.

Another preferred form of the invention is a method of making a multi-layer golf ball. The method comprises the steps of (1) obtaining a golf ball core, (2) forming an inner cover layer over the core, and (3) forming an outer cover layer over the inner cover layer. The inner cover layer has a Shore D hardness of about 56–65. The outer cover layer has a Shore D hardness of about 65–70 and is harder than the inner cover layer. The sum of the thickness of the inner cover layer and the thickness of the outer cover layer is at least 0.090 inches.

The invention accordingly comprises the several steps and the relation of one or more of such steps with respect to each of the others and the article possessing the features, properties, and the relation of elements exemplified in the following detailed disclosure.

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g., temperature, moisture, atmospheric pressure, wind, etc.) generally determine the distance a ball will travel when hit. Generally, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125±5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel 2.0 inches thick.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

PGA compression is another important property involved in the performance of a golf ball. The compression of the ball can affect the playability of the ball on striking and the sound or "click" produced. Similarly, compression can effect the "feel" of the ball (i.e., hard or soft responsive feel), particularly in chipping and putting.

Moreover, while compression itself has little bearing on the distance performance of a ball, compression can affect the playability of the ball on striking. The degree of compression of a ball against the club face and the softness of the cover strongly influences the resultant spin rate. Typically, a softer cover will produce a higher spin rate than a harder cover. Additionally, a harder core will produce a higher spin rate than a softer core. This is because at impact, a hard core serves to compress the cover of the ball against the face of the club to a much greater degree than a soft core thereby resulting in more "grab" of the ball on the clubface and subsequent higher spin rates. In effect, the cover is squeezed between the relatively incompressible core and clubhead. When a softer core is used, the cover is under much less compressive stress than when a harder core is used and therefore does not contact the clubface as intimately. This results in lower spin rates.

The term "compression" utilized in the golf ball trade generally defines the overall deflection that a golf ball undergoes when subjected to a compressive load. For example, PGA compression indicates the amount of change in a golf ball's shape upon striking. The development of solid core technology in two-piece balls has allowed for much more precise control of compression in comparison to thread wound three-piece balls. This is because in the manufacture of solid core balls, the amount of deflection or deformation is precisely controlled by the chemical formula used in making the cores. This differs from wound three-piece balls wherein compression is controlled in part by the winding process of the elastic thread. Thus, two-piece and multi-layer solid core balls exhibit much more consistent compression readings than balls having wound cores such as the thread wound three-piece balls.

In the past, PGA compression related to a scale of from 0 to 200 given to a golf ball. The lower the PGA compression value the softer the feel of the ball upon striking. In practice, tournament quality balls have compression ratings around 70 to 110, preferably around 80 to 100.

In determining PGA compression using a 0 to 200 scale, a standard force is applied to the external surface of the ball. A ball which exhibits no deflection (0.0 inches in deflection) is rated 200 and a ball which deflects 2/10th of an inch (0.2 inches) is rated 0. Every change of 0.001 of an inch in deflection represents a 1 point drop in compression. Consequently, a ball which deflects 0.1 inches (100×0.001 inches) has a PGA compression value of 100 (i.e., 200–100) and a ball which deflects 0.110 inches (110×0.001 inches) has a PGA compression of 90 (i.e., 200–100).

In order to assist in the determination of compression, several devices have been employed by the industry. For example, PGA compression is determined by an apparatus fashioned in the form of a small press with an upper and lower anvil. The upper anvil is at rest against a 200 pound die spring, and the lower anvil is movable through 0.300 inches by means of a crank mechanism. In its open position the gap between the anvils is 1.780 inches allowing a clearance of 0.100 inches for insertion of the ball. As the lower anvil is raised by the crank, it compresses the ball against the upper anvil, such compression occurring during the last 0.200 inches of stroke of the lower anvil, the ball then loading the upper anvil which in turn loads the spring. The equilibrium point of the upper anvil is measured by a dial micrometer if the anvil is deflected by the ball more than 0.100 inches (less deflection is simply regarded as zero compression) and the reading on the micrometer dial is referred to as the compression of the ball. In practice, tournament quality balls have compression ratings around 80 to 100 which means that the upper anvil was deflected a total of 0.120 to 0.100 inches.

An example to determine PGA compression can be shown by utilizing a golf ball compression tester produced by Atti Engineering Corporation of Newark, N.J. The value obtained by this tester relates to an arbitrary value expressed by a number which may range from 0 to 100, although a value of 200 can be measured as indicated by two revolutions of the dial indicator on the apparatus. The value obtained defines the deflection that a golf ball undergoes when subjected to compressive loading. The Atti test apparatus consists of a lower movable platform and an upper movable spring-loaded anvil. The dial indicator is mounted such that it measures the upward movement of the spring-loaded anvil. The golf ball to be tested is placed in the lower platform, which is then raised a fixed distance. The upper portion of the golf ball comes in contact with and exerts a pressure on the spring-loaded anvil. Depending upon the distance of the golf ball to be compressed, the upper anvil is forced upward against the spring.

Alternative devices have also been employed to determine compression. For example, Applicant also utilizes a modified Riehle Compression Machine originally produced by Riehle-Bros. Testing-Machine Company, Philadelphia, Pa., to evaluate compression of the various components (i.e., cores, mantle cover balls, finished balls, etc.) of the golf balls. The Riehle compression device determines deformation in thousandths of an inch. Using such a device, a Riehle compression of 61 corresponds to a deflection under load of 0.061 inches.

Additionally, an approximate relationship between Riehle compression and PGA compression exists for balls of the same size. It has been determined by Applicant that Riehle compression corresponds to PGA compression by the general formula PGA compression=160–Riehle compression. Consequently, 80 Riehle compression corresponds to 80 PGA compression, 70 Riehle compression corresponds to 100 PGA compression. For reporting purposes, Applicant's compression values are usually measured as Riehle compression and converted to PGA compression.

Furthermore, additional compression devices may also be utilized to monitor golf ball compression so long as the correlation to PGA compression is known. These devices have been designed, such as a Whitney Tester, to correlate or correspond to PGA compression through a set relationship or formula.

Referring now to the drawings, a golf ball according to the invention is shown and is designated as 8. The ball preferably has a diameter of at least 1.68 inches.

The golf ball includes a central solid core 10 and a multi-layer cover 12. The multi-layer cover includes an inner cover layer 14, and an outer cover layer 16 with dimples 18. The inner cover layer 14 comprises an ionomer and is softer than the outer cover layer 16. The ionomer that is used to form the inner cover layer 14 can be a single type of ionomer or a blend of two, three, four or more types of ionomers. Hardening and/or softening modifiers can be blended with the ionomers. The inner cover layer has a Shore D hardness of about 56–65.

Cover Assembly

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

In a preferred form of the invention, the inner cover layer is substantially comprised of ionomer resin. The outer cover layer preferably contains at least 50 parts by weight ionomer based upon 100 parts by weight of resin, and more preferably at least 75 parts by weight ionomer based upon 100 parts by weight of resin. Preferably, the inner cover layer comprises an ionomer with an average wt % acid content of about 15 or less which is at least 10% neutralized. In a particularly preferred form of the invention, the inner cover layer 14 constitutes a blend of two types of ionomers in which one component of the blend is an ethylene-acrylic acid or ethylene-methacrylic acid copolymer containing at least 15 wt % acid groups which are at least partially neutralized with a cation, and the other type of ionomer is a terpolymer of ethylene, acrylic acid or methacrylic acid and a softening termonomer such as butyl acrylate or methyl acrylate, resulting in an overall wt % acid content of about 15 or less.

The outer cover layer 16 comprises an ionomer. The outer layer 16 can contain a single type of ionomer or a blend of two, three, four or more types of ionomers. Furthermore, hardening and/or softening modifier can be added. The outer cover layer is harder than the inner cover layer, and has a Shore D hardness of about 60 or more, more preferably 65 or more and most preferably about 69. In a particularly preferred form of the invention, the outer cover layer contains an ionomer having at least 16 weight % acid groups, which are at least partially neutralized.

The inner and outer layers together form a cover having a thickness of 0.090–0.250 inches (0.23–0.64 mm), more preferably about 0.090–0.20 inches (0.23–0.51 mm), and most preferably about 0.090–0.110 inches (0.23–0.28 mm). The inner cover layer has a thickness of 0.021–0.200 inches (0.053–0.51 mm) and more preferably about 0.040–0.050 inches (0.10–0.13 mm). The outer cover layer preferably has a thickness of about 0.025–0.200 inches (0.063–0.51 mm), and more preferably 0.050–0.060 inches (0.13–0.15 mm). The ratio of the diameter of the ball to the thickness of the cover, ie., the sum of the thickness of the inner cover layer and the outer cover layer, is no more than about 19:1, and preferably no more than about 17:1.

The hardness of the inner and outer cover layers, and the compositions and thicknesses of these layers are appropriate to result in a golf ball having a COR of at least 0.780, and more preferably about 0.786–0.206. The golf ball of the invention has an overall PGA compression of 30–90, more preferably about 65–75.

More specifically, the inner cover layer preferably comprises at least 50 percent weight of an ionomer. Preferably, the ionomer has average wt % acid content of about 15 or less which is at least 10% neutralized. Preferably, the inner cover layer 14 includes a blend of hard and soft ionomer resins including but not limited to those described in U.S. Pat. Nos. 4,884,814 and 5,120,791, both of which are incorporated herein by reference. For example, a blend of a high modulus ionomer (i.e., a hard ionomer) and a low modulus ionomer (i.e., a soft ionomer) in a mixture can be used. A high modulus ionomer is one which has a flexural modulus of about 15,000–70,000 psi or more as measured under ASTM method D-790. The hardness of this type of ionomer is at least 50 on the Shore D scale as measured in accordance with ASTM method D-2240. A low modulus ionomer which can be blended with the high modulus ionomer to form the inner layer has a flexural modulus of about 1,000 to about 15,000 psi (ASTM D-790), and a hardness of about 20–40 on the Shore D scale (ASTM D-2240).

The hard ionomer resins used in blends to form the inner cover layer 14 include ionic copolymers which are the, e.g., sodium, zinc, magnesium, calcium manganese, nickel, barium, tin, copper, potassium or lithium, etc. salt, or blend thereof, of the reaction product of an olefin having from 2 to 8 carbon atoms and an unsaturated monocarboxylic acid having from 3 to 8 carbon atoms and which result in a ball having the desired combination of COR, compression, and inner cover layer hardness. The carboxylic acid groups of the copolymer may be totally or partially, that is 10–100%, neutralized. The hard ionomeric resins typically are copolymers of ethylene with acrylic and/or methacrylic acid. Two or more hard ionomer resins can be blended.

The metal cation salts utilized in the invention are those salts which provide the metal cations capable of neutralizing, to various extents, the carboxylic acid groups of the high acid copolymer. These include acetate, oxide or hydroxide salts of, e.g., lithium, calcium, zinc, sodium, potassium, nickel, magnesium, barium, tin, copper and manganese, etc.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide and magnesium acetate. Sources of manganese include manganese acetate and manganese oxide.

The metal cation neutralized high acid ionomer resins can be produced by reacting the high acid base copolymer with various amounts of the metal cation salts above the crystalline melting point of the copolymer, such as at a temperature from about 200° F. to about 500° F., preferably about 250° to about 350° F. under high shear conditions at a pressure of from about 10 psi to 10,000 psi. Other blending techniques may also be used. The amount of metal cation salt utilized to produce the new metal cation neutralized high acid based ionomer resins is the quantity which provides a sufficient amount of the metal cations to neutralize the desired percentage of the carboxylic acid, and generally from about 10% to about 90%.

Examples of commercially available hard ionomeric resins which can be used in a blend to form the inner cover layer 14 include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid with about 15 weight % acid which is about 29% neutralized with sodium ions. This resin has an average melt flow index of about 2.9. Surlyn® 9910 is a copolymer of ethylene and methacrylic acid with about 15 weight % acid which is about 58% neutralized with zinc ions. The average melt flow index of Surlyn® 9910 is about 0.7. Additional examples include Iotek 4000, Iotek 4010, Iotek 8020, Iotek 8030, Iotek 7010 and lotek 7030 which are sold by Exxon Corporation. It is to be understood that the above examples are for illustrative purposes and are by no means intended to be limiting.

Non-limiting examples of soft ionomers to be blended with the above-described hard ionomers to form the inner cover layer 14 of the inventive golf ball comprise sodium, zinc magnesium, calcium, manganese, nickel, barium, tin, copper potassium or lithium, etc. salts of a terpolymer of an olefin having from about 2 to 8 carbon atoms, acrylic acid or methacrylic acid, and a softening comonomer which is an unsaturated monomer of the acrylate ester class having from 1 to 21 carbon atoms. The soft ionomer is preferably an ionomer made from and acrylic acid-based polymer and an unsaturated monomer of the acrylate este class. The soft (low modulus) ionomers have a hardness from about 20 to 40 as measured on the Shore D scale and a flexural modulus from about 1,000 to about 15,000, as measured in accordance with ASTM method D-790.

Certain ethylene-acrylic acid based soft ionomer resins developed by the Exxon Corporation under the designation "lotek 7520" may be combined with known hard ionomers such as those indicated above to produce the inner cover. The combination produces higher CORs at equal or lower levels of hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials costs and improved yields. Furthermore, lotek 7510, Surlyn® 8320 and Surlyn® 8120 also can be used.

It has been determined that when hard-soft ionomer blends are used for the inner cover layer good results are achieved when the relative combination is in a range of about 90 to about 10% hard ionomer and about 20 to about 90% soft ionomer. The results are improved by adjusting the range to about 75 to 25% hard ionomer and 25 to 75% soft ionomer.

Specific formulations which may be used in the cover composition are included in the examples set forth in U.S. Pat. Nos. 5,120,791 and 4,884,814, herein incorporated by reference. The present invention is in no way limited to those examples.

The outer cover layer 16 of the golf ball is harder than the inner cover layer and generally, but not necessarily, has a different chemical composition than the inner cover layer. The outer cover layer 16 preferably, but not necessarily, comprises a high acid ionomer resin or high acid ionomer blend in which more than 10 weight % of the acid groups are neutralized. Preferably, the outer cover layer 16 is formed from a blend of two or more high acid ionomer resins that are neutralized to different extents using different metal cations. Softening modifiers can be used to achieve the desired Shore hardness of the outer cover layer.

The high acid ionomers which can be used in formulating the outer cover layer of the golf ball are ionic copolymers which are the metal salts of the reaction product of an olefin having from about 2 to 8 carbon atoms and an unsaturated monocarboxylic acid having from about 3 to 8 carbon atoms. As non-limiting examples, sodium, zinc, magnesium, manganese, potassium, calcium, nickel, barium, tin, copper and lithium can be used as the neutralizing cation. Preferably, the ionomeric resins are copolymers of ethylene with either acrylic or methacrylic acid. In some circumstances, an additional comonomer such as an acrylate ester, e.g., iso-n-butylacrylate, etc., can also be used to produce a somewhat softer terpolymer. The carboxylic acid groups of the copolymer are partially neutralized by the metal ions, i.e., about 10–75% or more preferably about 30–70%. Each of the high acid ionomer resins which may be included in the outer cover layer composition preferably contains more than 16% by weight of a carboxylic acid, preferably 17 to 25% by weight of a carboxylic acid, and most preferably about 18.5 to 21.5% by weight of a carboxylic acid. Examples of commercially available high acid acrylic acid-based ionomers which can be used in accordance with the invention include Surlyn® 6120 (magnesium cation), Surlyn® 8162 (zinc cation), Surlyn® 8140 (sodium cation) and Surlyn® 8140 (sodium cation).

Examples of high acid acrylic acid-based ionomers which can be used in the present invention also include the Escor® or Iotek High Acid Ethylene Ionomers produced by Exxon, including Iotek 1006, Iotek 8610 and Iotek 7030. Furthermore, a number of other high acid ionomers neutralized to various extents by different types of metal cations, including manganese, lithium, potassium, calcium and nickel and several new high acid ionomers and/or high acid ionomer blends other than sodium, zinc and magnesium are now available for golf ball cover production.

As indicated above, softening comonomers can be included in the ionomeric inner and/or outer cover layers. Non-limiting examples of a softening comonomer include vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, butyl acrylate, butyl methacrylate, or the like.

Examples of a number of copolymers suitable for use to produce the high acid ionomers used in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, and ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 30 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

As indicated above, the inner cover layer 14 and/or outer cover layer 16 optionally may include hardening or softening modifiers, non-limiting examples of which include a metal stearate, such as zinc stearate, or another fatty acid salt, as described in commonly assigned U.S. Pat. Nos. 5,306,760 and 5,312,857. One purpose of the metal stearate or other fatty acid salt is to reduce the cost of production of the ball without affecting overall performance of the finished ball. Furthermore, polar-group modified rubbers can be blended with ionomers as described, for example, in commonly assigned U.S. Pat. Nos. 4,986,545; 5,098,105; 5,187, 013; 5,330,837 and 5,338,610, all of which are hereby incorporated by reference. Thermoplastic elastomers which act as hardening or softening agents, including polyurethane, a polyester elastomer such as that sold by DuPont as Hytrel®, a polyester polyurethane such as B.F. Goodrich Company's Estane® polyester polyurethane X-4517, and a polyester amide such as that sold by Elf Atochem S. A. under the name Pebax®, can be added. A plastomer such as that sold by Exxon under the name Exact™, e.g., Exact™ 4049 can be included. Various plasticizers and processing aids also can be used.

When the golf ball of the invention has more than two cover layers, the inner cover layer as defined in this application can be formed from two or more layers which, taken together, meet the requirements of softness, thickness and compression of the layer or layers which are defined herein as the inner cover layer. Similarly, the outer cover layer can be formed from two or more layers which, taken together, meet the requirements of hardness, thickness and compression of the layer or layers which are defined herein as the outer cover layer. Furthermore, one or more additional, very thin ionomeric or non-ionomeric layers can be added on either side of the inner cover layer as long as the objectives of the invention are achieved.

The inner cover layer, outer cover layer and core may contain coupling agents that increase adhesion of materials within a particular layer, e.g., to couple a filler to a resin composition, or between adjacent layers. Non-limiting examples of coupling agents include titanates, zirconates and silanes. Coupling agents typically are used in amounts of 0.1–2 wt % based upon the total weight of the composition in which the coupling agent is included.

Core Assembly

The core of the golf ball preferably is made of a cross linked unsaturated elastomer and preferably comprises a thermoset rubber such as polybutadiene, but also can be made of other core materials which provide sufficient COR. The diameter of the core is determined based upon the desired overall ball diameter, minus the combined thicknesses of the inner and outer cover layers. The COR of the core is appropriate to impart to the finished golf ball a COR of at least 0.780, and preferably 0.786–0.806 The core typically has a diameter of about 1.0 to 1.6 inches, preferably 1.4 to 1.6 inches, a PGA compression of 10 to 20, and a COR in the range of 0.740 to 0.780.

Preferably, the cores of the present invention golf balls comprise a high molecular weight polybutadiene that exhibits an ultra high Mooney viscosity. Most preferably, the polybutadienes for use in cores of the present invention golf balls are formed from using a neodymium catalyst. Details of these aspects are set forth in two applications assigned to the assignee of the present invention: U.S. application Ser. No. 09/226,727 filed Jan. 7, 1999 entitled, "Golf Ball Cores Using Blends of High Molecular Weight and Neodymium Butadiene Rubber" and U.S. application Ser. No. 09/226,340 filed Jan. 6, 1999 entitled, "Golf Ball Cores Formed From Ultra High Mooney Viscosity Butadiene Rubber," both of which are herein incorporated by reference.

The preferred polybutadiene resin for use in the present invention core composition has a relatively ultra high Mooney viscosity. A "Mooney" unit is an arbitrary unit used to measure the plasticity of raw, or unvulcanized rubber. The plasticity in Mooney units is equal to the torque, measured on an arbitrary scale, on a disk in a vessel that contains rubber at a temperature of 212° F. (100° C.) and that rotates at two revolutions per minute.

The measurement of Mooney viscosity, i.e. Mooney viscosity [$ML_{1+4}$ (100° C.)], is defined according to the standard ASTM D-1646, herein incorporated by reference. In ASTM D-1646, it is stated that the Mooney viscosity is not a true viscosity, but a measure of shearing torque over a range of shearing stresses. Measurement of Mooney viscosity is also described in the *Vanderbilt Rubber Handbook*, 13th Ed., (1990), pages 565–566, also herein incorporated by reference. Generally, polybutadiene rubbers have Mooney viscosities, measured at 212° F., of from about 25 to about 65. Instruments for measuring Mooney viscosities are commercially available such as a Monsanto Mooney Viscometer, Model MV 2000. Another commercially available device is a Mooney viscometer made by Shimadzu Seisakusho Ltd.

As will be understood by those skilled in the art, polymers may be characterized according to various definitions of molecular weight. The "number average molecular weight," $M_n$, is defined as:

$$M_n = \frac{\Sigma W_i}{\Sigma W_i / M_i}$$

where $W_i$ is the molecular weight of a fraction or sample of the polymer and $M_i$ is the total number of fractions or samples.

"Weight average molecular weight," $M_w$, is defined as:

$$M_w = \frac{\Sigma W_i M_i}{\Sigma W_i}$$

where $W_i$ and $M_i$ have the same meanings as noted above.

The "Z-average molecular weight," $M_z$, is defined as:

$$M_z = \frac{\Sigma W_i M_i^2}{\Sigma W_i M_i}$$

where $W_i$ and $M_i$ also have the same meanings as noted above.

"$M_{peak}$" is the molecular weight of the most common fraction or sample, i.e. having the greatest population.

Considering these various measures of molecular weight, provides an indication of the distribution or rather the "spread" of molecular weights of the polymer under review.

A common indicator of the degree of molecular weight distribution of a polymer is its "polydispersity," P:

$$P = \frac{M_w}{M_n}$$

Polydispersity, or "dispersity" as sometimes referred to herein, also provides an indication of the extent to which the polymer chains share the same degree of polymerization. If the polydispersity is 1.0, then all polymer chains have the same degree of polymerization. Since weight average molecular weight is always equal to or greater than the number average molecular weight, polydispersity, by definition, is equal to or greater than 1.0:

P≧1.0

The particular polybutadiene for use in the preferred embodiment compositions of the present invention (i) exhibits a Mooney viscosity of from about 65 to about 85, and preferably from about 70 to about 83; ii) has a number average molecular weight $M_n$ of from about 90,000 to about 130,000; and preferably from about 100,000 to about 120,000; iii) has a weight average molecular weight $M_w$ of from about 250,000 to about 350,000; and preferably from about 290,000 to about 310,000; iv) has a Z-average molecular weight $M_z$ of about 600,000 to about 750,000; and preferably from about 660,000 to about 700,000; and, v) has a peak molecular weight $M_{peak}$ of about 150,000 to about 200,000; and preferably from about 170,000 to about 180,000.

The polydispersity of the particular polybutadiene for use in the preferred embodiment compositions typically ranges from about 1.9 to about 3.9; and preferably from about 2.4 to about 3.1. Most preferably, the polydispersity is about 2.7.

The particular polybutadiene for use in the preferred embodiment compositions preferably contains a majority fraction of polymer chains containing a cis-1,4 bond, more preferably, having a cis-1,4 polybutadiene content of about 90%, and most preferably, having a cis-1,4 polybutadiene content of at least about 95%. Although not wishing to be bound to any particular theory, the present inventors have also discovered that a preferred polybutadiene, as described herein, is obtained by utilizing a cobalt or cobalt-based catalyst, a lanthanum rare earth catalyst, nickel catalyst, or other catalysts such as aluminum, boron, lithium, neodymium, titanium, and combinations thereof.

The polybutadiene utilized in the present invention is a solid at room temperature. Consequently, the polybutadiene is referenced as a "solid" polybutadiene, as opposed to a "liquid" which generally means that the rubber is flowable at room temperature.

A commercially available polybutadiene corresponding to the noted preferred ultra-high viscosity polybutadiene, and which is suitable for use in the preferred embodiment compositions in accordance with the present invention is available under the designation Cariflex BCP 820, from Shell Chimie of France. The properties and characteristics of this preferred polybutadiene are set forth below in Table 1.

TABLE 1

Properties of Shell Chimie BCP 820 (Also known as BR-1202J)

| Property | Value | |
|---|---|---|
| Mooney Viscosity (approximate) | 73–83 | |
| Volatiles Content | 0.5% maximum | |
| Ash Content | 0.1% maximum | |
| Cis 1,4-polybutadiene Content | 95.0% minimum | |
| Stabilizer Content | 0.2 to 0.3% | |
| Polydispersity | 2.7 | |
| Molecular Weight Data: | Trial 1 | Trial 2 |
| $M_n$ | 110,000 | 111,000 |
| $M_w$ | 300,000 | 304,000 |
| $M_z$ | 680,000 | |
| $M_{peak}$ | 175,000 | |

The compositions of the present invention may also utilize other polybutadiene resins in addition to the noted particular polybutadiene exhibiting an ultra-high Mooney viscosity, such as the BCP 820 resin. For example, Cariflex BR-1220 polybutadiene available from Shell Chemical (see Table 2 below); and Taktene 220 polybutadiene available from Bayer Corp. of Orange, Tex. (see Tables 3A and 3B below) may be utilized as other polybutadienes in combination with the particular ultra-high Mooney viscosity polybutadiene component described herein. Generally, these other polybutadienes have Mooney viscosities in the range of about 25 to 65. It is also contemplated that a similar polybutadiene resin, BCP 819, commercially available from Shell Chimie, may be used in conjunction with BCP 820.

TABLE 2

Properties of Cariflex BR-1220 Polybutadiene

Physical Properties:

Polybutadiene Rubber
CIS 1,4 Content - 97%–99% Min.
Stabilizer Type - Non Staining
Total Ash - 0.5% Max.
Specific Gravity - 0.90–0.92
Color - Transparent, clear, Lt. Amber
Moisture - 0.3% max. ASTM 1416.76 Hot Mill Method
Polymer Mooney Viscosity - (35–45 Cariflex) (ML1 + 4 @ 212° F.)
90% Cure - 10.0–13.0
Polydispersity 2.75–3.0

| Molecular Weight Data: | Trial 1 | Trial 2 |
|---|---|---|
| $M_n$ | 80,000 | 73,000 |
| $M_w$ | 220,000 | 220,000 |
| $M_z$ | 550,000 | |
| $M_{peak}$ | 110,000 | |

TABLE 3A

Properties of Taktene 220 Polybutadiene

Physical Properties:

Polybutadiene Rubber
CIS 1,4 Content (%) - 98% Typical
Stabilizer Type - Non Staining 1.0–1.3%
Total Ash - 0.25 Max.
Raw Polymer Mooney Visc. - 35–45 40 Typical
(ML1 + 4' @ 212 Deg. F./212° F.)
Specific Gravity - 0.91
Color - Transparent - almost colorless (15 APHA Max.)
Moisture % - 0.30% Max. ASTM 1416-76 Hot Mill Method

TABLE 3B

Properties of Taktene 220 Polybutadiene

| Product Description | A low Mooney viscosity, non-staining, solution polymerized, high cis-1,4-polybutadiene rubber. | | |
|---|---|---|---|
| | Property | Range | Test Method |
| Raw Polymer Properties | Mooney viscosity 1 + 4 (212° F.) | 40 ± 5 | ASTM D 1646 |
| | Volatile matter (wt %) | 0.3 max. | ASTM D 1416 |
| | Total Ash (wt %) | 0.25 max. | ASTM D 1416 |
| Cure[1][2] Characteristics | Minimum torque | | |
| | $M_L$ (dN.m) (lbf).in) | 9.7 ± 2.2 8.6 ± 1.9 | ASTM D 2084 ASTM D 2084 |
| | Maximum torque | | |
| | $M_H$ (dN.m) (lbf.in) | 35.7 ± 4.8 31.6 ± 4.2 | ASTM D 2084 ASTM D 2084 |
| | $t_2 1$ (min) | 4 ± 1.1 | ASTM D 2084 |
| | t'50 (min) | 9.6 ± 2.5 | ASTM D 2084 |
| | t'90 (min) | 12.9 ± 3.1 | ASTM D 2084 |

TABLE 3B-continued

| | Property | Typical Value |
|---|---|---|
| Other Product Features | Specific gravity | 0.91 |
| | Stabilizer type | Non-staining |

(1)Monsanto Rheometer at 160° C., 1.7 Hz (100 cpm), 1 degree arc, micro-die
(2)Cure characteristics determined on ASTM D 3189 MIM mixed compound:
TAKTENE 220    100 (parts by mass)
Zinc oxide    3
Stearic acid    2
IRB #6 black (N330)    60
Naphthenic oil    15
TBBS    0.9
Sulfur    1.5
*This specification refers to product manufactured by Bayer Corp., Orange, Texas, U.S.A.

The preferred embodiment core compositions of the present invention generally comprise about 100 parts by weight of elastomeric or rubber components, i.e. the noted ultra-high Mooney viscosity polybutadiene, and from about 60 to about 80, or more, parts by weight of non-rubber or non-elastomeric components. Preferably, the core compositions comprise about 100 parts of rubber components and from about 60 to about 80, or more, parts by weight of non-rubber components. It will be understood that depending upon the types and respective function of components added to the non-rubber portion of the preferred embodiment core compositions, that the non-rubber portion may constitute a significant proportion of the rubber component. The rubber components include the previously described ultra-high Mooney viscosity polybutadiene. The non-rubber components are as follows.

Preferably, the crosslinking agent of the core composition is an unsaturated carboxylic acid component which is the reaction product of a carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the preferred core compositions are acrylic acid, methacrylic acid, itaconic acid, crotonic acid, sorbic acid, and the like, and mixtures thereof. Preferably, the acid component is either acrylic or methacrylic acid. Usually, from about 15 to about 50, and preferably from about 20 to about 35 parts by weight of the carboxylic acid salt, such as zinc diacrylate (ZDA), is included per 100 parts of the rubber components in the core composition. The unsaturated carboxylic acids and metal salts thereof are generally soluble in the elastomeric base, or are readily dispersible.

The free radical initiator included in the core composition is any known polymerization initiator (a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bix (buylperoxy) valerate, 1,1-bis (t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, a peroxyketal manufactured and sold by Akzo Chemie America, Chicago, Ill. The one hour half life of Luperco 231 XL and Trigonox 29/40 is about 112° C., and the one hour half life of Luperco 230 XL and Trigonox 17/40 is about 129° C. Luperco 230 XL and Trigonox 17/40 are n-butyl4,4-bis(t-butylperoxy) valerate and Luperco 231 XL and Trigonox 29/40 are 1,1-di(t-butylperoxy) 3,3,5-trimethyl cyclohexane.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 10 parts by weight per 100 parts by weight of the rubbers (phr) component.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, zinc oxide, silica, mica, barytes, calcium carbonate, or clays. Limestone is ground calcium/magnesium carbonate and is used because it is an inexpensive, heavy filler. Other heavy weight fillers include metal particles, such as powdered tungsten.

As indicated, ground flash filler may be incorporated and is preferably 20 mesh ground up center stock from the excess flash from compression molding. It lowers the cost and may increase the hardness of the ball.

Fatty acids or metallic salts of fatty acids, or metal soaps, may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid, palmitic, oleic and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 20 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates known to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above-identified-patents, which are incorporated herein by reference.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

The most preferred polybutadiene for use in the preferred embodiment golf ball core compositions is a polybutadiene that is obtained or synthesized by utilizing a neodymium or lanthanide series catalyst, and that exhibits a Mooney viscosity of from about 30 to about 70, preferably from about 35 to about 70, more preferably from about 40 to about 65, and most preferably from about 45 to about 60.

Examples of such polybutadienes obtained by using a neodymium-based catalyst include NEOCIS 40, NEOCIS 60 from Enichem and CB-22, CB-23, and CB-24 from Bayer. The properties of these polybutadienes are given below.

TABLE 4

Properties of NEOCIS

Properties of Raw Polymer

Microstructure

| | |
|---|---|
| 1,4 cis (typical) | 97.5% |
| 1,4 trans (typical) | 1.7% |
| Vinyl (typical) | 0.8% |
| Volatile Matter (max) | 0.75% |
| Ash (max) | 0.30% |
| Stabilizer (typical) | 0.50% |
| Mooney Viscosity, ML 1 + 4 at 100° C. | 38–48 and 60–66 |

Properties of compound (typical)

| | |
|---|---|
| Vulcanization at 145° C. | |
| Tensile strength, 35' cure, | 16 MPa |
| Elongation, 35' cure, | 440% |
| 300% modulus, 35' cure, | 9.5 MPa |

TABLE 5

Properties of CB-22

| TESTS | RESULTS | SPECIFICATIONS |
|---|---|---|
| 1. Mooney-Viscosity | | |
| ML1 + 4 100 Cel/ASTM-sheet | | |
| ML1 + 1 Minimum | 58 | MIN.58 ME |
| Maximum | 63 | MAX.68 ME |
| Median | 60 | 58–68 ME |
| 2. Content of ash | | |
| DIN 53568 | | |
| Ash | 0.1 | MAX.0.5% |
| 3. Volatile matter | | |
| heating 3 h/105 Cel | | |
| Loss in weight | 0.11 | MAX.0.5% |

TABLE 5-continued

Properties of CB-22

| TESTS | RESULTS | SPECIFICATIONS |
|---|---|---|
| 4. Organic acid | | |
| Bayer Nr.18 | | |
| Acid | 0.33 | MAX.1.0% |
| 5. CIS-1,4 content | | |
| IR-spectroscopy | | |
| CIS 1,4 | 97.62 | MIN.96.0% |
| 6. Vulcanization behaviour | | |
| Monsanto MDR/160 Cel | | |
| DIN 53529 | | |
| Compound after | | |
| ts01 | 3.2 | 2.5–4.1 min |
| t50 | 8.3 | 6.4–9.6 min |
| t90 | 13.2 | 9.2–14.0 min |
| s'min | 4.2 | 3.4–4.4 dN.m |
| s'max | 21.5 | 17.5–21.5 dN.m |
| 7. Informative data | | |
| Vulcanization 150 Cel 30 min | | |
| Tesile | ca. 15,0 | |
| Elongation at break | ca. 450 | |
| Stress at 300% elongation | ca. 9,5 | |

TABLE 6

Properties of CB-23

| TESTS | RESULTS | SPECIFICATIONS |
|---|---|---|
| 1. Mooney-Viscosity | | |
| ML1 + 4 100 Cel/ASTM-sheet | | |
| ML1 + 4 Minimum | 50 | MIN.46 ME |
| Maximum | 54 | MAX.56 ME |
| Median | 51 | 46–56 ME |
| 2. Content of ash | | |
| DIN 53568 | 0.09 | MAX.0.5% |
| Ash | | |
| 3. Volatile matter | | |
| DIN 53526 | | |
| Loss in weight | 0.19 | MAX.0.5% |
| 4. Organic acid | | |
| Bayer Nr.18 | | |
| Acid | 0.33 | MAX.1.0% |
| 5. CIS-1,4 content | | |
| IR-spectroscopy | | |
| CIS 1,4 | 97.09 | MIN.96.0% |
| 6. Vulcanization behaviour | | |
| Monsanto MDR/160 Cel | | |
| DIN 53529 | | |
| Compound after | MIN.96.0 | |
| ts01 | 3.4 | 2.4–4.0 min |
| t50 | 8.7 | 5.8–9.0 min |
| t90 | 13.5 | 8.7–13.5 min |
| s'min | 3.1 | 2.7–3.8 dN.m |
| s'max | 20.9 | 17.7–21.7 dN.m |
| 7. Vulcanization test | | |
| with ring | | |
| Informative data | | |
| Tesile | ca 15,5 | |
| Elongation at break | ca. 470 | |
| Stress at 300% elongation | ca. 9,3 | |

TABLE 7

Properties of CB-24

| TESTS | RESULTS | SPECIFICATIONS |
|---|---|---|
| 1. Mooney-Viscosity | | |
| ML1 + 4 100 Cel/ASTM-sheet | | |
| ML1 + 4 Minimum | 44 | MIN.39 ME |
| Maximum | 46 | MAX.49 ME |
| Median | 45 | 39–49 ME |

TABLE 7-continued

Properties of CB-24

| TESTS | RESULTS | SPECIFICATIONS |
|---|---|---|
| 2. Content of ash | | |
| DIN 53568 | | |
| Ash | 0.12 | MAX.0.5% |
| 3. Volatile matter | | |
| DIN 53526 | | |
| Loss in weight | 0.1 | MAX.0.5% |
| 4. Organic acid | | |
| Bayer Nr.18 | | |
| Acid | 0.29 | MAX.1.0% |
| 5. CIS-1,4 content | | |
| IR-spectroscopy | | |
| CIS 1,4 | 96.73 | MIN.96.0% |
| 6. Vulcanization behaviour | | |
| Monsanto MDR/160 Cel | | |
| DIN 53529 | | |
| Compound after | | |
| masticator | | |
| ts01 | 3.4 | 2.6–4.2 min |
| t50 | 8.0 | 6.2–9.4 min |
| t90 | 12.5 | 9.6–14.4 min |
| s'min | 2.8 | 2.0–3.0 dN.m |
| s'max | 19.2 | 16.3–20.3 dN.m |
| 7. Informative data | | |
| Vulcanization 150 Cel 30 min | | |
| Tesile | ca 15,0 | |
| Elongation at break | Ca. 470 | |
| Stress at 300% elongation | ca. 9,1 | |

Conventional solid cores are typically compression molded from a slug of uncured or lightly cured elastomer composition comprising a high cis content polybutadiene and a metal salt of an $\alpha,\beta$, ethylenically unsaturated carboxylic acid such as zinc mono or diacrylate or methacrylate. To achieve higher coefficients of restitution in the core, the manufacturer may include fillers such as small amounts of a metal oxide such as zinc oxide. In addition, larger amounts of metal oxide than those that are needed to achieve the desired coefficient are often included in conventional cores in order to increase the core weight so that the finished ball more closely approaches the U.S.G.A. upper weight limit of 1.620 ounces. Other materials may be used in the core composition including compatible rubbers or ionomers, and low molecular weight fatty acids such as stearic acid. Free radical initiators such as peroxides are admixed with the core composition so that on the application of heat and pressure, a complex curing cross-linking reaction takes place.

Having generally described the invention, the following examples are included for purposes of illustration so that the invention may be more readily understood and are in no way intended to limit the scope of the invention unless otherwise specifically indicated.

EXAMPLE 1

About 2 dozen thermoset polybutadiene golf ball cores having a conventional composition, a PGA compression of 93, a COR of 0.782 and a diameter of 1.47 inches were molded in a conventional manner. An inner cover layer of a first ionomer formed from a blend of a soft acrylic acid based ionomer containing a softening comonomer and a hard acrylic acid based ionomer, designated as ionomer 1, having a thickness of 0.050 inches and a Shore D hardness of 55 was injection molded over the cores. The resulting covered cores had a PGA compression of 94 and a COR of 0.789.

An outer cover layer formed from a blend of two hard acrylic acid-based ionomers and designated as ionomer 2 was injection molded over the inner cover layer. The outer cover layer had a thickness of 0.055 inches and Shore D hardness of 68. The balls were primed and clear coated in a uniform manner. The balls with the two-part cover had an average PGA compression of about 99, and a COR of about 803. The spin rate of the balls was determined by striking the balls with a 9-iron under conditions of launch angle, ball speed and tee position which produced a spin rate of about 7100 rpm for a two-piece hard covered ball (1994 Top-Flite XL) and a spin rate of about 9700 rpm for a thread wound balata covered ball (1994 Titleist Tour 100) using the same club.

The properties of the balls, core and cover layers are shown on Table 8.

EXAMPLES 2–4

The procedure of Example 1 was repeated using three different combinations of inner and outer cover layer materials at the same cover layer thicknesses. The results are shown on Table 8.

COMPARATIVE EXAMPLES 1–2

The procedure of Example 1 was repeated with the exception that the same material was used for the inner and outer cover layers of a particular ball. In Comparative Example 1, two layers of ionomer 2 were used. In Comparative Example 2, two layers of ionomer 4 were used. The results are shown on Table 8.

While the balls of Comparative Examples 1 and 2 exhibited favorable COR, their PGA compressions were unfavorably high. On the other hand, the balls of Examples 1–3 had favorable soft compressions while maintaining good COR. The balls of Example 4 had a reasonably good compression while maintaining a good COR. It is also noted that the balls of Comparative Example 1–2 had a somewhat higher spin rate than the balls of Comparative Example 1, and the balls of Examples 3–4 had a somewhat higher spin rate than the balls of Comparative Example 2. This slightly higher spin will contribute to improved playability and feel versus the balls of Comparative Examples while still being relatively low in spin as compared to soft covered balls.

COMPARATIVE EXAMPLES 3–6

Conventional thermoset polybutadiene golf ball cores having a diameter of 1.57 inches, a PGA compression of 88, and a COR of 780 were covered with a single layer of cover material having a thickness of 0.055 inches. Four different types of ionomeric covers were used. The balls were then primed and clear coated in the same manner as the balls of Examples 1–4. The resulting two-piece golf balls had measurements of PGA compression, COR, Shore D cover hardness, and spin as shown on Table 8.

As shown in Comparative Examples 3–6, the COR of the golf balls increased as the hardness of the ball increased. As shown by comparative Example 6, ionomer 1 is too soft for use alone as an outer cover layer and results in an insufficient COR. As shown by Comparative Example 5, ionomer 3 is also soft and produced a ball having a marginally acceptable COR and a relatively hard compression. The balls of Comparative Examples 3 and 4 are inferior to the balls of Examples 1–4 because for a give COR, the PGA compressions of the balls of Comparative Examples 3 and 4 are relatively hard, even though the core compressions were softer (prior to cover molding) than those of Examples 1–4.

EXAMPLES 5–6

The procedure of Example 1 was repeated with the exception that cores having sizes of 1.43 inches and 1.545 inches were used. Furthermore, inner and outer cover layers of different thicknesses were used. The cover layer thicknesses and properties as well as resulting golf ball properties are shown on Table 8.

COMPARATIVE EXAMPLE 7

The procedure of Example 5 was repeated with the exception that the inner and outer cover layers were formed from the same material. The results are shown on Table 8.

-continued

| Ingredients | Parts |
|---|---|
| Third polybutadiene[3] | 30.0 |
| Zinc oxide | 31.0 |
| Zinc stearate | 16.0 |
| Zinc diacrylate | 18.2 |

TABLE 8

| | Core | | | Inner Cover Layer | | | | Outer Cover Layer | | | Ball | | |
|---|---|---|---|---|---|---|---|---|---|---|---|---|---|
| Example # | Size (inches) | COMP (PGA) | COR[1] | Material | Thickness (inches) | COMP[2] (PGA) | COR[1,3] | Hardness (Shore D) | Material Ionomer 3 | Thickness (inches) | Hardness (Shore D) | COMP (PGA) | COR[1] | SPIN (RPM) |
| 1 | 1.47 | 93 | 782 | Ionomer 1 | 0.050 | 94 | 789 | 55 | Ionomer 2 | 0.055 | 68 | 99 | 803 | 7508 |
| 2 | 1.47 | 93 | 782 | Ionomer 3 | 0.050 | 94 | 795 | 63 | Ionomer 2 | 0.055 | 68 | 102 | 809 | 7650 |
| Comp. 1 | 1.47 | 93 | 782 | Ionomer 2 | 0.050 | 94 | 799 | 68 | Ionomer 2 | 0.055 | 68 | 109 | 819 | 7390 |
| 3 | 1.47 | 93 | 782 | Ionomer 1 | 0.050 | 94 | 789 | 55 | Ionomer 4 | 0.055 | 73 | 101 | 809 | 6626 |
| 4 | 1.47 | 93 | 782 | Ionomer 3 | 0.050 | 94 | 795 | 63 | Ionomer 4 | 0.055 | 73 | 107 | 816 | 6358 |
| Comp. 2 | 1.47 | 93 | 782 | Ionomer 4 | 0.050 | 95 | 805 | 73 | Ionomer 4 | 0.055 | 73 | 112 | 830 | 6258 |
| Comp. 3 | 1.57 | 88 | 780 | None | — | — | — | — | Ionomer 2 | 0.055 | 68 | 99 | 800 | 7331 |
| Comp. 4 | 1.57 | 88 | 780 | None | — | — | — | — | Ionomer 4 | 0.055 | 73 | 104 | 808 | 6516 |
| Comp. 5 | 1.57 | 88 | 780 | None | — | — | — | — | Ionomer 3 | 0.055 | 63 | 98 | 792 | 8421 |
| Comp. 6 | 1.57 | 88 | 780 | None | — | — | — | — | Ionomer 1 | 0.055 | 55 | 93 | 782 | 9479 |
| 5 | 1.43 | — | 787 | Ionomer 1 | 0.090 | 90 | 792 | 56 | Ionomer 2 | 0.057 | 68 | 101 | 799 | 7435 |
| 6 | 1.545 | 89 | 790 | Ionomer 1 | 0.033 | 89 | 794 | 56 | Ionomer 2 | 0.057 | 68 | 100 | 809 | 7382 |
| Comp. 7 | 1.43 | — | 787 | Ionomer 2 | 0.090 | 103 | 815 | 68 | Ionomer 2 | 0.057 | 68 | 115 | 820 | 7230 |

[1]Actual COR values have been multiplied by 1000
[2]COMP of inner cover layer and core
[3]CORE of inner cover layer and core While Example 5 and Comparative Example 7 both had ionomeric cover layers with the same overall thickness, the ball of Example 5 is superior to that of Comparative Example 7 in that the compression of the ball of Comparative Example 7 is too high. Again, the spin rate for Example 5 is somewhat higher than Comparative Example 7, which will contribute to improved feel and playability while not being so high (as with a soft-covered ball) as to cause problems (slice/hook) for the less skilled golfer. In order to reduce compression, rather than reducing the outer cover layer thickness, as was done in Comparative Example 3, Example 5 shows that by using a multi-layer ionomer cover with a softer inner layer and a harder outer layer, a golf ball having a favorable combination of relatively soft compression and good coefficient of restitution can be obtained.

As shown by Example 6, a slight reduction in the thickness of the overall ionomeric cover material does not substantially affect the compression of the ball and contributes to favorable values of COR.

EXAMPLE 7

A number of golf ball cores having the formulation shown below were formed:

| Ingredients | Parts |
|---|---|
| First polybutadiene[1] | 40.0 |
| Second polybutadiene[2] | 30.0 |

-continued

| Ingredients | Parts |
|---|---|
| Coloring Agent | 0.05 |
| Peroxide Initiator[4] | 1.25 |

[1]High Molecular Weight Polybutadiene Rubber, High Cis
[2]High Cis Polybutadiene Rubber, 60 Mooney
[3]High Cis Polybutadiene Rubber, 40 Mooney
[4]Trigonox 42-40b, Akzo Chemicals Inc., Chicago, IL The cores were about 1.48 inches in diameter (1.479 inches–0.005 inches) and weighed about 33.1 grams +/–0.4 grams. They had a PGA compression of about 15 (+/–5) and a COR of about 0.758 (+/–0.010). An inner cover layer or mantle material containing Surlyn 9910, Surlyn 8940 and Iotek 7520 in the respective ratio of 50/20/30 (wt. %'s) was molded over the cores. The diameter of the core with the inner cover layer formed thereover was about 1.570 inches+/–0.004 inches. The inner cover layer had a thickness of about 0.45 inches, and a Shore D hardness of about 59. The PGA compression of the inner cover layer when molded about the core was about 37+/–5. The inner cover layer molded over the core had a weight of 38.4 grams+/–0.3 grams, a C.O.R. of 0.771+/–0.010 and a Riehle compression of about 123+/–5.

An outer cover layer of Iotek 1006, Iotek 8610, Surlyn 6120 and ionomeric masterbatch was subsequently molded over the inner cover layer. The cover had a thickness of about 0.55 inches and a Shore D hardness of about 69. The finished golf balls had a PGA compression of about 70+/−5, a diameter of about 1.682 inches +/−0.0025 inches and a weight of about 45.5 grams +/−0.35 grams.

Various physical properties of the finished golf balls were then tested along with those of several commercially available balls. The results are summarized in Table 9. The spin rate of the balls and the distance traveled by the balls when struck by a driver, a 5 iron and a 9 iron was measured. The golf balls were struck by the driver at various club head speeds and launch angles to simulate the variations produced by golfers. The results labeled as Pro. Driver distance were struck at a club head speed of 153 mph and a launch angle of about 9.5 degrees. The distance results labeled as USGA Driver were struck at a club head speed of 151 mph and a launch angle of 10 degrees. The distance results labeled as Amateur Driver were struck at a club head speed of 126 mph and a launch angle of about 12 degrees. The spin rate for the driver was the back spin measured using the Pro. Driver setup conditions. Spin rate and distance results for the balls when struck by a 5 iron were determined using a club head speed of 122 mph and a launch angle of about 15 degrees. Spin rate for the balls when struck with a 9 iron were determined using a club head speed of about 120 mph and a launch angle of about 24 degrees.

The results of the testing, as displayed in Table 9, show that the ball of the present invention offers a softer compression (feel), similar distance and moderate spin rate compared to current three piece balls. The softer compression is a result of a softer core and a softer, relatively thin mantle layer. Distance is maintained by using a harder, more resilient cover material.

TABLE 10

Finished Ball Data

| Sample # | Core #/ Mantle ID | Size | Weight | Comp | COR | Natural Frequency |
|---|---|---|---|---|---|---|
| 12A | 1 | 1.686 | 44.7 | 73 | .793 | 3268 |
| 12B | 2 | 1.687 | 45.6 | 89 | .795 | 2773 |
| 12C | 3 | 1.687 | 44.7 | 76 | .790 | 2946 |
| 12D | 4 | 1.687 | 45.5 | 86 | .795 | 2847 |
| 12E | 5 | 1.686 | 44.7 | 71 | .796 | 3194 |
| 12F | 6 | 1.687 | 45.5 | 86 | .798 | 6045 |
| 12G | 7 | 1.687 | 45 | 75 | .796 | 2798 |
| 12H | 8 | 1.689 | 45.9 | 89 | .798 | 2971 |
| 12I | 9 | 1.687 | 44.2 | 77 | .795 | 3169 |
| 12J | 10 | 1.688 | 45.1 | 94 | .800 | 2847 |
| 12K | 11 | 1.688 | 44.4 | 84 | .780 | 2971 |
| 12L | 12 | 1.689 | 44.9 | 95 | .780 | 2674 |
| 12M | 13 | 1.688 | 45.7 | 78 | .756 | 3070 |
| 12N | 14 | 1.687 | 46.9 | 96 | .760 | 2872 |
| 12O | 15 | 1.688 | 44.6 | 73 | .798 | 3169 |
| 12P | 16 | 1.688 | 45.3 | 86 | .800 | 2971 |
| 12Q | 17 | 1.686 | 44.3 | 73 | .797 | 3268 |
| 12R | 18 | 1.687 | 445.2 | 90 | .802 | 2847 |
| 12S | 19 | 1.688 | 44.9 | 73 | .789 | 2996 |
| 12T | 20 | 1.688 | 45.6 | 86 | .790 | 2872 |
| 12U | 21 | 1.686 | 44.4 | 73 | .797 | 3045 |
| 12V | 22 | 1.687 | 45.3 | 82 | .804 | 2748 |
| 12W | 23 | 1.686 | 44.7 | 57 | .817 | 3466 |
| 12X | 24 | 1.687 | 45.5 | 66 | .822 | 3219 |

Notes
All mantles were covered with the following cover blend: Surlyn 8140, 35%; Surlyn 6120, 52.5%; White MB, 12.5%.
This cover has a Shore D of 70–71.

TABLE 9

| | Ball Properties | | | | | Distance | | | |
|---|---|---|---|---|---|---|---|---|---|
| | PGA | Cover Hardness | Spin Rate | | | USGA | | | |
| Product | Comp. | COR | (Shore D) | Driver | 5 Iron | 9 Iron | Pro Driver | Driver | Am. Driver | 5 Iron |
| Sample Balls | 70 | .796 | 69 | 2408 | 5100 | 8691 | 287 | 274 | 227 | 186 |
| Spalding Strata Distance | 80 | .804 | 64 | 2570 | 5091 | 8725 | 290 | 274 | 221 | 186 |
| Maxfli Tour Patriot 90 | 75 | .791 | 65 | 2920 | 5816 | 9363 | 294 | 273 | 223 | 182 |
| Titleist HP Distance | 79 | .800 | 69 | 2546 | 5573 | 8867 | 282 | 274 | 222 | 182 |
| Titleist DT Distance | 85 | .809 | 66 | 2589 | 5611 | 9065 | 290 | 275 | 225 | 184 |
| Wilson Smart Core Pro. Dist. 90 | 79 | .807 | 69 | 2566 | 5083 | 8922 | 289 | 276 | 225 | 186 |

Notes:
All spin rates are in revolutions per minute (rpm's)
All spin rates are a measurement of the backspin only
All distances are the combined carry and roll distance

EXAMPLE 12

In another series of trials, finished golf balls were produced having a wide array of core and mantle combinations. Table 10, set forth below, lists golf ball samples 12A–12X, each with a particular core/mantle identification number. Tables 11 and 12, also set forth below, detail the core type, mantle material, and characteristics of such, for each core/mantle item. Table 10 further lists various physical properties and characteristics of the resulting finished golf balls. Table 13, set forth below, lists measured values for the same physical properties and characteristics of several comparable commercially available golf balls.

TABLE 11

| Core #/ Mantle ID # | Core Type | Mantle Material | Shore C/D *1 | Size (inches) | Weight (grams) | Comp | COR |
|---|---|---|---|---|---|---|---|
| 1 | A | 1 | 62/41 | 1.571 | 37.5 | 88 | .773 |
| 2 | B | 1 | 62/41 | 1.571 | 38.3 | 110 | .772 |
| 3 | A | 2 | 60/35 | 1.569 | 37.4 | 89 | .769 |
| 4 | B | 2 | 60/35 | 1.573 | 38.2 | 111 | .771 |
| 5 | A | 3 | 68/44 | 1.569 | 37.4 | 87 | .774 |
| 6 | B | 3 | 68/44 | 1.571 | 38.2 | 111 | .770 |
| 7 | A | 4 | 50/32 | 1.573 | 37.9 | 89 | .770 |

TABLE 11-continued

| Core #/ Mantle ID # | Core Type | Mantle Material | Mantle Data Shore C/D *1 | Size (inches) | Weight (grams) | Comp | COR |
|---|---|---|---|---|---|---|---|
| 8 | B | 4 | 50/32 | 1.573 | 38.7 | 110 | .771 |
| 9 | A | 5 | 37/22 | 1.571 | 37 | 92 | .772 |
| 10 | B | 5 | 37/22 | 1.571 | 37.7 | 114 | .770 |
| 11 | A | 6 | 26/15 | 1.573 | 37.2 | 106 | .748 |
| 12 | B | 6 | 26/15 | 1.571 | 38. | 125 | .746 |
| 13 | A | 7 | 41/21 | 1.572 | 39 | 94 | .752 |
| 14 | B | 7 | 41/21 | 1.572 | 39.8 | 119 | .750 |
| 15 | A | 8 | 52/31 | 1.571 | 37.1 | 89 | .772 |
| 16 | B | 8 | 52/31 | 1.569 | 37.9 | 110 | .775 |
| 17 | A | 9 | 52/30 | 1.569 | 37.1 | 88 | .774 |
| 18 | B | 9 | 52/30 | 1.57 | 37.8 | 113 | .773 |
| 19 | A | 10 | 62/39 | 1.574 | 37.6 | 87 | .769 |
| 20 | B | 10 | 62/39 | 1.573 | 38.4 | 111 | .771 |
| 21 | A | 11 | 55/39 | 1.568 | 37.1 | 88 | .772 |
| 22 | B | 11 | 55/39 | 1.574 | 38. | 108 | .772 |
| 23 | A | 12 | 91/64 | 1.572 | 37.5 | 74 | .800 |
| 24 | B | 12 | 91/64 | 1.572 | 38.3 | 92 | .805 |

*1> As measured on runner
Mantle 1> 100 pts Iotek 7510
Mantle 2> 100 pts Surlyn 8320
Mantle 3> 100 pts Surlyn 8542
Mantle 4> 100 pts Pebax 3533
Mantle 5> 100 pts Exact 4049
Mantle 6> GLS Dynaflex 2712
Mantle 7> Colorite 6550-02
Mantle 8> 15 pts Escor ATX 325
12.5 pts Iotek 1002
12.5 pts Iotek 1003
60 pts Exact 4049
Mantle 9> 12.5 pts Iotek 1002
12.5 pts Iotek 1003
75 pts Exact 4049
Mantle 10> 12.5 pts Iotek 1002
12.5 pts Iotek 1003
75 pts Iotek 7510
Mantle 11> 15 pts Escor ATX 325
12.5 pts Iotek 1002
12.5 pts Iotek 1003
60 pts Nordel 4770 EPDM
Mantle 12> 50 pts Iotek 1002
50 pts Iotek 1003

TABLE 12

| Core # | Size | Weight | Comp | COR |
|---|---|---|---|---|
| A | 1.468 | 32.5 | 92 | .771 |
| B | 1.469 | 31.7 | 115 | .773 |

TABLE 13

| Comparable Examples | Size | Weight | Comp | COR | Natural Frequency |
|---|---|---|---|---|---|
| Top Flite ® XL | 1.683 | 45.5 | 58 | .792 | 3689 |
| XL 2000 Extra Long | 1.684 | 45.3 | 76 | .814 | 2971 |
| Strata ™ Tour Professional | 1.682 | 45.7 | 92 | .791 | 2451 |
| Strata ™ ML Balata 90 | 1.685 | 45.7 | 89 | .786 | 2946 |

As will be apparent to persons skilled in the art, various modifications and adaptations of the structure and methods above described will become readily apparent without departure from the spirit and scope of the invention, the scope of which is defined in the appended claims.

We claim:

1. A golf ball comprising:
   (a) a core comprising a polybutadiene composition having an ultra-high Mooney viscosity in the range of 65 to 85,
   (b) an inner cover layer substantially consisting of ionomer, the inner cover layer having a Shore D hardness of 65 or less, and
   c) an outer cover layer comprising an ionomer, the outer cover layer being harder than the inner cover layer and having a Shore D hardness of at least 60,
   the sum of the thickness of the inner cover layer and the thickness of the outer cover layer being at least 0.090 inches.

2. A golf ball according to claim 1 wherein the polybutadiene composition exhibits a Mooney viscosity, prior to curing, of greater than 70 and a polydispersity of less than 4.

3. A golf ball according to claim 2 wherein the polybutadiene composition exhibits a Mooney viscosity of about 73 to about 83.

4. A golf ball according to claim 2 wherein the polybutadiene is synthesized in the presence of a lanthanide series catalyst.

5. A golf ball according to claim 1, wherein the ball has a coefficient of restitution of at least 0.780.

6. A golf ball according to claim 1, wherein the ball has a coefficient of restitution of 0.786–0.806.

7. A golf ball according to claim 1, wherein the inner cover layer has a thickness of 0.020–0.200 inches.

8. A golf ball according to claim 1, wherein the inner cover layer has a thickness of 0.040–0.050 inches.

9. A golf ball according to claim 7, wherein the outer cover layer has a thickness of 0.025–0.200 inches.

10. A golf ball according to claim 8, wherein the outer cover layer has a thickness of 0.050–0.060 inches.

11. A golf ball according to claim 1, wherein the inner cover layer has a Shore D hardness of 57–63.

12. A golf ball according to claim 11, wherein the outer cover layer has a Shore D hardness of at least 65–73.

13. A golf ball according to claim 1, wherein the inner cover layer comprises an ionomer having an average weight percent acid content of 15 or less and which is at least 10 percent neutralized.

14. A golf ball according to claim 1, wherein the outer cover layer comprises an ionomer having an average weight percent acid content of 16 or more that is at least 10 percent neutralized.

15. A golf ball according to claim 1, wherein the core is selected from the group consisting of non-wound cores containing liquid, gel or solid, and wound cores.

16. A golf ball according to claim 1, wherein the core comprises a thermoset rubber.

17. A golf ball according to claim 1, wherein the inner cover layer comprises a blend of a hard ionomer and a soft ionomer.

18. A golf ball according to claim 1, wherein the PGA compression of the ball is no more than 80.

19. A golf ball according to claim 1, wherein the PGA compression of the ball is 67–73.

20. A golf ball comprising:
   (a) a core comprising a polybutadiene composition having an ultra-high Mooney viscosity in the range of 65 to 85,
   (b) a thermoplastic inner cover layer substantially consisting of ionomer, the inner cover layer having a Shore D hardness of no more than about 65 and disposed about the core, and (c) an outer cover layer comprising an ionomer, having a Shore D hard-ness of at least 60, and being harder than the inner cover layer, the outer cover layer disposed on the inner cover layer, wherein the golf ball has a PGA compression of no more than about 80 and a coefficient of restitution of at least 0.780, and the ratio of the diameter of the ball to the sum of the thickness of the inner cover layer and the thickness of the outer cover layer is less than 19:1.

21. A golf ball according to claim 20 wherein the polybutadiene composition exhibits a Mooney viscosity, prior to curing, of at least 70 and a polydispersity of less than 4.

22. A golf ball according to claim 21 wherein the polybutadiene composition exhibits a Mooney viscosity of about 73 to about 83.

23. A golf ball according to claim 21 wherein the polybutadiene is synthesized in the presence of a lanthanide series catalyst.

24. A method of making a multi-layer golf ball, comprising:

obtaining a golf ball core comprising a polybutadiene composition having, prior to curing, an ultra high Mooney viscosity, forming a thermoplastic inner cover layer over the core, the inner cover layer substantially consisting of ionomer, the inner cover layer having a Shore D hardness of about 65 or less, and forming an outer cover layer over the inner cover layer, the outer cover layer having a Shore D hardness of at least about 60 and being herder than the inner cover layer, such that the combined thickness of the inner cover layer and the outer cover layer is at least 0.090 inches.

25. A method according to claim 24 wherein the inner cover layer is applied in a thickness of about 0.040 to 0.050 inches.

26. The golf ball produced by the method of claim 24.

* * * * *